United States Patent
Scodary

(10) Patent No.: US 11,880,420 B2
(45) Date of Patent: *Jan. 23, 2024

(54) METHOD FOR QUERYING LONG-FORM SPEECH

(71) Applicant: Gridspace Inc., San Francisco, CA (US)

(72) Inventor: Anthony Scodary, Los Angeles, CA (US)

(73) Assignee: Gridspace Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,800

(22) Filed: Aug. 5, 2021

(65) Prior Publication Data

US 2021/0365512 A1    Nov. 25, 2021

Related U.S. Application Data

(63) Continuation of application No. 16/109,553, filed on Aug. 22, 2018, now Pat. No. 11,138,278.

(51) Int. Cl.
*G06F 16/9535* (2019.01)
*G06F 40/205* (2020.01)

(52) U.S. Cl.
CPC ........ *G06F 16/9535* (2019.01); *G06F 40/205* (2020.01)

(58) Field of Classification Search
CPC .............. G06F 16/9535; G06F 40/205; G06F 16/9536; G06F 16/9538
See application file for complete search history.

(56) References Cited

U.S. PATENT DOCUMENTS

| | | | |
|---|---|---|---|
| 6,055,531 A | 4/2000 | Bennett et al. | |
| 2003/0177112 A1* | 9/2003 | Gardner | G16B 5/20 |
| 2008/0320037 A1 | 12/2008 | MacGuire et al. | |
| 2009/0306979 A1 | 12/2009 | Jaiswal et al. | |
| 2011/0273455 A1 | 11/2011 | Powar et al. | |
| 2011/0319160 A1* | 12/2011 | Arn | G10H 1/368 |
| | | | 463/30 |
| 2013/0204885 A1 | 8/2013 | Clinchant et al. | |
| 2013/0347019 A1* | 12/2013 | Herlein | H04N 21/41415 |
| | | | 725/22 |
| 2014/0089365 A1* | 3/2014 | Dubout | G06V 10/431 |
| | | | 708/403 |
| 2015/0039538 A1 | 2/2015 | Hefeeda et al. | |

(Continued)

OTHER PUBLICATIONS

Eugene Rules list, archived Oct. 18, 2014, https://web.archive.org/web/20141018124711/https://j5.jbei.org/j5manual/pages/85.html (Year: 2014).*

(Continued)

*Primary Examiner* — Allen S Lin
(74) *Attorney, Agent, or Firm* — Rowan TELS LLC

(57) ABSTRACT

A method including parsing a query into a tree of operations, generating a query matrix and a transcript matrix, determining a cross-correlation of the query matrix and the transcript matrix, applying a softness map to the cross-correlation to determine one or more matches for each of the literals, and combining the one or more matches utilizing the tree of operations to generate an output, each of the operators corresponding to a combination operation for the matches.

20 Claims, 14 Drawing Sheets

(56) References Cited

U.S. PATENT DOCUMENTS

| | | | |
|---|---|---|---|
| 2015/0227505 A1* | 8/2015 | Morimoto | G06F 40/30 |
| | | | 704/9 |
| 2017/0192994 A1 | 7/2017 | Hong et al. | |
| 2018/0330009 A1* | 11/2018 | Pidduck | G06F 16/9038 |
| 2018/0349477 A1* | 12/2018 | Jaech | G06F 16/3334 |
| 2019/0117142 A1* | 4/2019 | Moskowitz | A61B 5/0004 |
| 2019/0304105 A1* | 10/2019 | Gao | G06V 20/13 |
| 2019/0354594 A1* | 11/2019 | Foster | G06F 40/56 |
| 2020/0004875 A1* | 1/2020 | McAteer | G10L 15/063 |

OTHER PUBLICATIONS

Jiafeng Guo et al: "Semantic Matching by Non-Linear Word Transportation for Information Retrieval", Oct. 24, 2016 (Oct. 24, 2016), Conference on Information and Knowledge Management, ACM, XP058299447, ISBN: 978-1-4503-4073-I pp. 701-710.
International Search Report for PCT Application PCT/US2019/046700, dated Nov. 12, 2019.
Written Opinion of the ISA for PCT Application PCT/US2019/046700, dated Nov. 12, 2019.

\* cited by examiner

METHOD FOR QUERYING LONG-FORM SPEECH

BACKGROUND

Search query engines may be utilized to determine whether words or phrases were used in a text document. Conventional search query engines focus on the actual word or phrase that was used instead of the meaning of that word or phrase. Also, those conventional search engines are neither accurate nor efficient. Thus, they may be of limited use in real-time search query applications, or even overall. Additionally, conventional search query engines do not search speech transcripts that are enriched with emotional metadata for concepts.

BRIEF SUMMARY

The search query engine converts a search query into a tree of operations using literals and operators. The query and a transcript may then be converted into a matrix of word embeddings that represent the meaning of the word and the cross-correlation of the two matrices is computed to find matches. In some instances, the cross-correlation of large transcript matrices may be accelerated by utilizing the Fourier transform of the matrix. Matches are then those dot products that fall with a softness threshold as determined by a softness map. In addition to matching words, non-speech data (e.g., emotions or speaker role) may be matched by expanding the dimensions of the word embedding matrices to include a metric for various parts of non-speech data.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein are embodiments of unconventional search engine algorithms that may be executed by a data processing device to return results much faster from unstructured or lightly structured data sources such as data files that are machine-generated speech-to-text transcripts of multi-participant voice conferences. In particular the new algorithms utilize a combination of processing that's particularly efficient for execution on text-to-speech converted transcript files, using the instruction set architecture of modern data processing integrated circuits such as central processing units (CPUs) and graphics processing units (CPUs).

Figure 1:
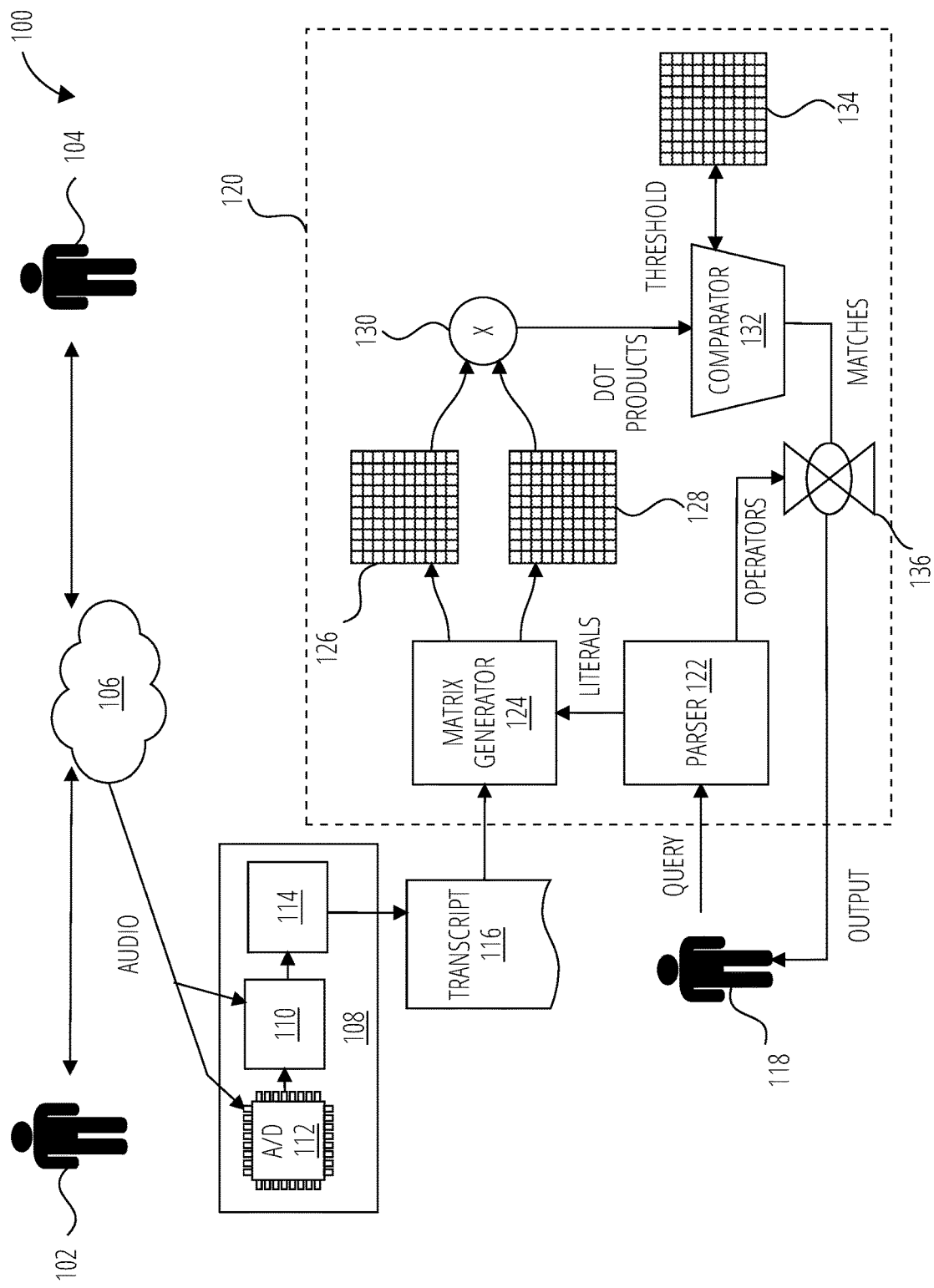
FIG. 1 illustrates an embodiment of a communication system 100.

Referring to FIG. 1, a communication system 100 comprises a first person 102, a second person 104, a network 106, an audio transformation system 108, a speech to text converter 110, an analog to digital converter 112, an enrichment logic 114, a digital transcript 116, a third person 118, a query engine 120, a query parser 122, a matrix generator 124, a query word embedding matrix 126, a transcript word embedding matrix 128, a cross-correlator 130, a comparator 132, a softness map 134, and a combiner 136.

The first person 102 is in audio communication with a second person 104 over a network 106, for example an IP network, analog telephone network, or cellular network.

Audio from the communications may be recorded, or streamed live to an audio transformation system 108, which converts the audio to metadata-enriched text. The audio transformation system 108 may comprise a speech to text converter 110 and enrichment logic 114 to transform the audio into the enriched text. If the audio is in an analog format, the audio transformation system 108 may utilize an analog to digital converter 112 to convert to a digital format before providing the digital audio to the speech to text converter 110.

The enriched text of the audio is output in the form of one or more digital files of a digital transcript 116. A third person 118 may search the digital transcript 116 using queries. The queries, along with the digital transcript 116, are operated on by a query engine 120. The query engine 120 may be operated according to the process depicted in FIG. 2.

The query engine 120 inputs the query to a query parser 122 to generate a tree of operations from words (literals) and operators of the query. The query parser 122 may generate the tree of operation in accordance with the process depicted in FIG. 3. The query parser 122 may further utilize the query types 400 to parse the query into the tree of operations. The literals and the digital transcript 116 are input to a matrix generator 124 to generate a query word embedding matrix 126 and a transcript word embedding matrix 128. The matrices may be generated in accordance with the process depicted in FIG. 6. These two matrices are input to a cross-correlator 130 to generate dot product pairs, which are input to a comparator 132. In some embodiments, such as those with large matrices, a fast Fourier transformation system may be utilized to generate the dot products. An embodiment of this system is depicted in FIG. 7. The comparator 132 identifies matches from dot products that fall with a softness threshold as determined by a softness map 134. The matches are combined (combiner 136) based on the operators extracted from the query by the query parser 122. The combiner 136 may be operated in accordance with the process depicted in FIG. 9. The combiner 136 generates an output. The combiner 136 may limit the number of outputs to a number of highest results, all results, or no results if the final weight is too low.

Figure 2:
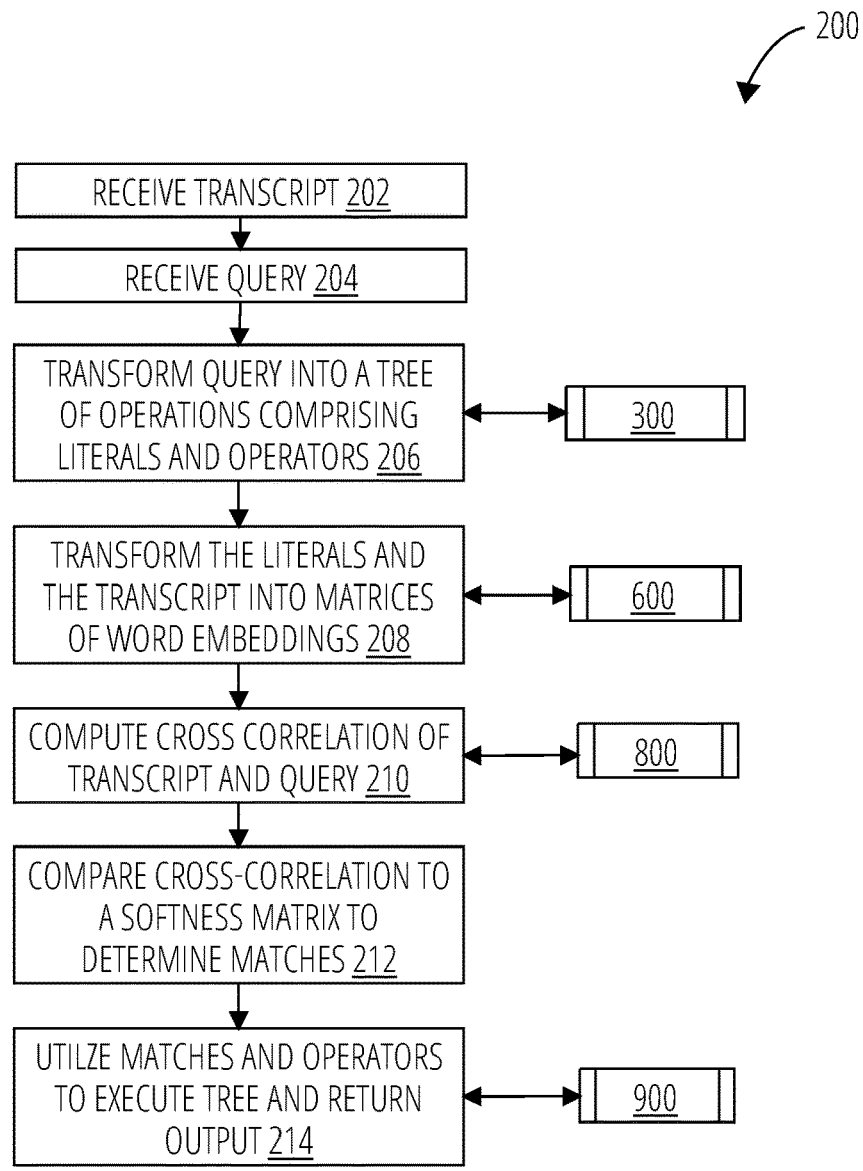
FIG. 2 illustrates an embodiment of a query method 200.
Figure 7:
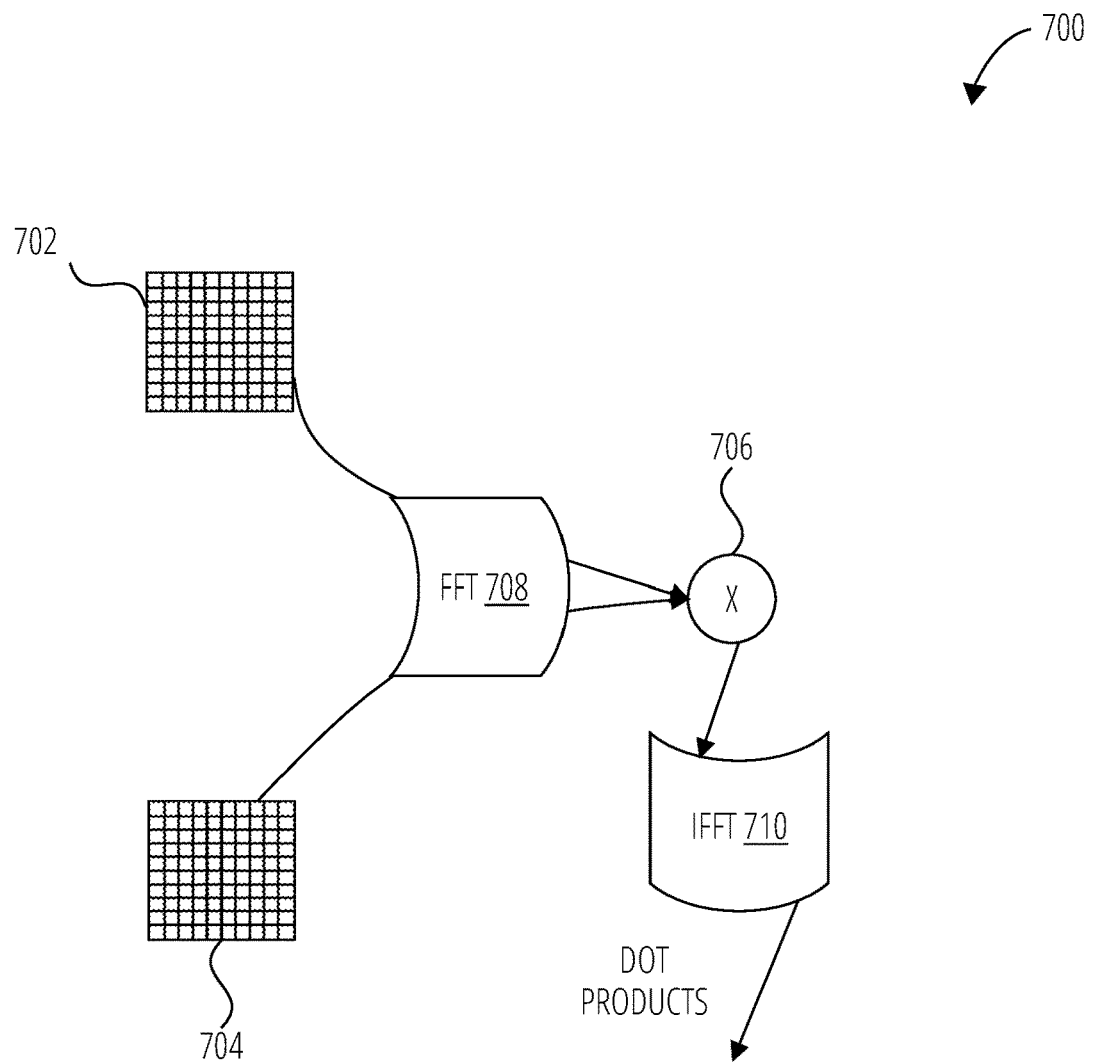
FIG. 7 illustrates an embodiment of a fast Fourier transformation system 700.
Figure 8:
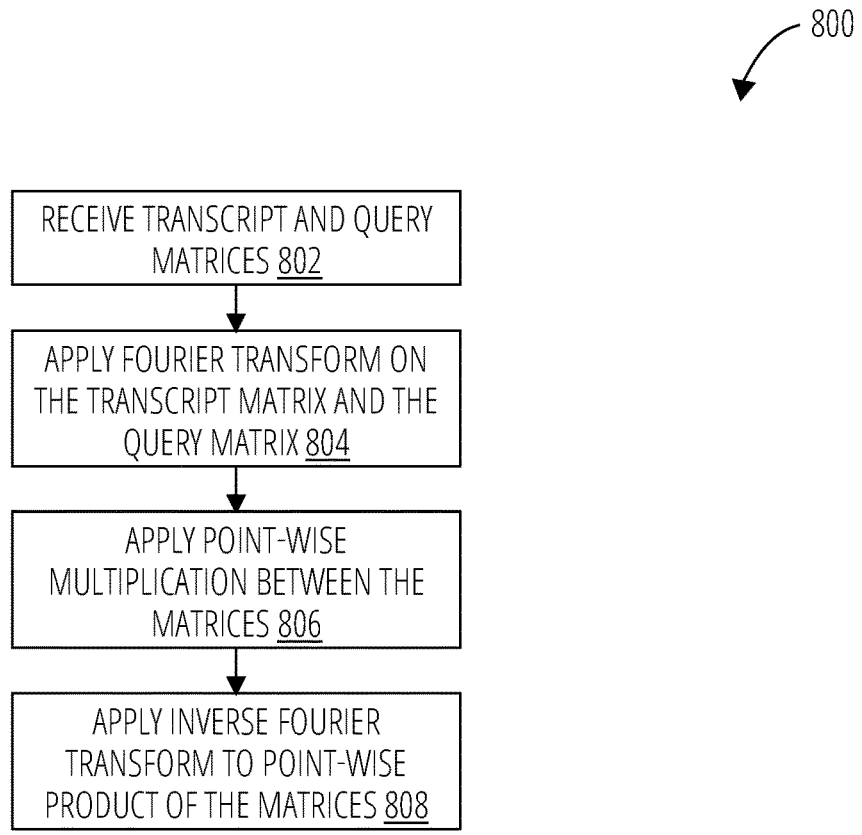
FIG. 8 illustrates an embodiment of a fast Fourier transformation method 800.

Referring to FIG. 2, a query method 200 receives a transcript (block 202). The transcript may be the digital transcript 116 discussed in FIG. 1. A query is then received (block 204). The query may comprise the query types discussed in reference to FIG. 4. The query is then transformed into a tree of operations comprising literals and operators (block 206). The tree of operation comprises operators as the stems and literals as the leaves. The operators may be unary or binary, that is, one or two connections, respectively, to a lower level on the tree of operations. The tree of operations may be generated by the process depicted in FIG. 3. Other tree generating algorithms may be utilized. The literals and the transcript are each transformed into matrix of word embeddings (block 208). The word embeddings may be stored in a control memory structure. The word embeddings may be multi-dimensional, such as 50-1000 dimensions. 300-dimension word embedding may be utilized to optimize efficiency and accuracy. The word embedding may be generated in accordance with the process depicted in FIG. 6. The dimension of embeddings may be expanded to store other non-speech information. For example, the speaker role (i.e., "agent" vs "caller") or the emotional content (0.0-1.0 based on how angry the speaker was) may be included. For "soft" outputs like the emotion model above, so long as it retains a higher match in a dot product (i.e., 1 dotted with 0.9 will be a high match), the dimension of the transcript embeddings may be extended to include the model outputs and the query embedding can be extended to include the query flag (0 vs 1 or similar). For any exemplary vector with 300-dimension word embeddings, an additional "301st" or more dimension is included to represent the non-speech information. For hard metadata (i.e., speaker role), this same method may be utilized, or a search index may be utilized to filter down transcript segments that match that metadata flag. Each literal may have its own query matrix. The cross-correlation of transcript and query are computed (block 210). The cross-correlation may be determined by:

$$C_n = \Sigma_{i=0}^{l} T_i \cdot Q_{i+n}$$  Equation 1 where C is the cross-correlation, T is the transcript matrix, Q is the query matrix, and l is the length of the transcript matrix, which is determined based on the number of words in the transcript. In some embodiments, such as larger transcript matrices, the cross-correlation is determined utilizing the Fourier transform of the matrices and the convolution Theorem. An exemplary system is depicted in FIG. 7 and the process is depicted in FIG. 8. A threshold matrix size may be utilized to determine whether the fast Fourier transformation system 700 is utilized. A cross-correlation may be determined for each literal. The cross-correlation is then compared to a softness map to determine matches (block 212). The softness map may be based on the degree of softness for the given literal(s). The softness map returns thresholds for each literal as each literal may have a different softness. The cross-correlation is compared to the threshold from the softness matrix to determine matches. Those cross-correlations for each literal that are exceed the threshold are determined to be matches. The matches and operators are utilized to execute the tree of operations to return the output (block 214). This may be performed in accordance with the process depicted in FIG. 9. The query method 200 may also utilize a shunting-yard algorithm to determine the output. Each operator may have composition rules stored to determine the effect on the matches. The matches for each literal may replace the literal in the tree of operations and multiple permutations of the tree of operations performed if multiple matches are determined for a literal. Prior to being output, a further threshold may be performed to eliminate those outputs with a low weight. The output may comprise the location of the match, the weight of the match, the query, the match, any extractions, etc.

In some embodiments, a query may be performed on a phrase. While the cross correlation behaves well on longer phrases, word ordering affects meaning. As such, being out of order may be penalized while permitting some word reordering. One method is to convolve the transcript embedding matrix with a kernel (e.g., a Gaussian kernel) in a soft query. This blurs the location of words by a few places, allowing word reordering to be tolerated to some degree. The convolution may also be performed on the query embedding matrix. This is functionally the same as the cross-correlation and may be determined by:

$$B_n = \Sigma_{i=0}^{l} C_i \cdot K_{i+n}$$  Equation 2 where B is the resulting blurred matrix, C is the matrix to be blurred, K is the Kernel, and l is the length of the matrix to be blurred. An example Kernel is: K=[0.05, 0.1, 0.7, 0.1, 0.05].

Figure 3:
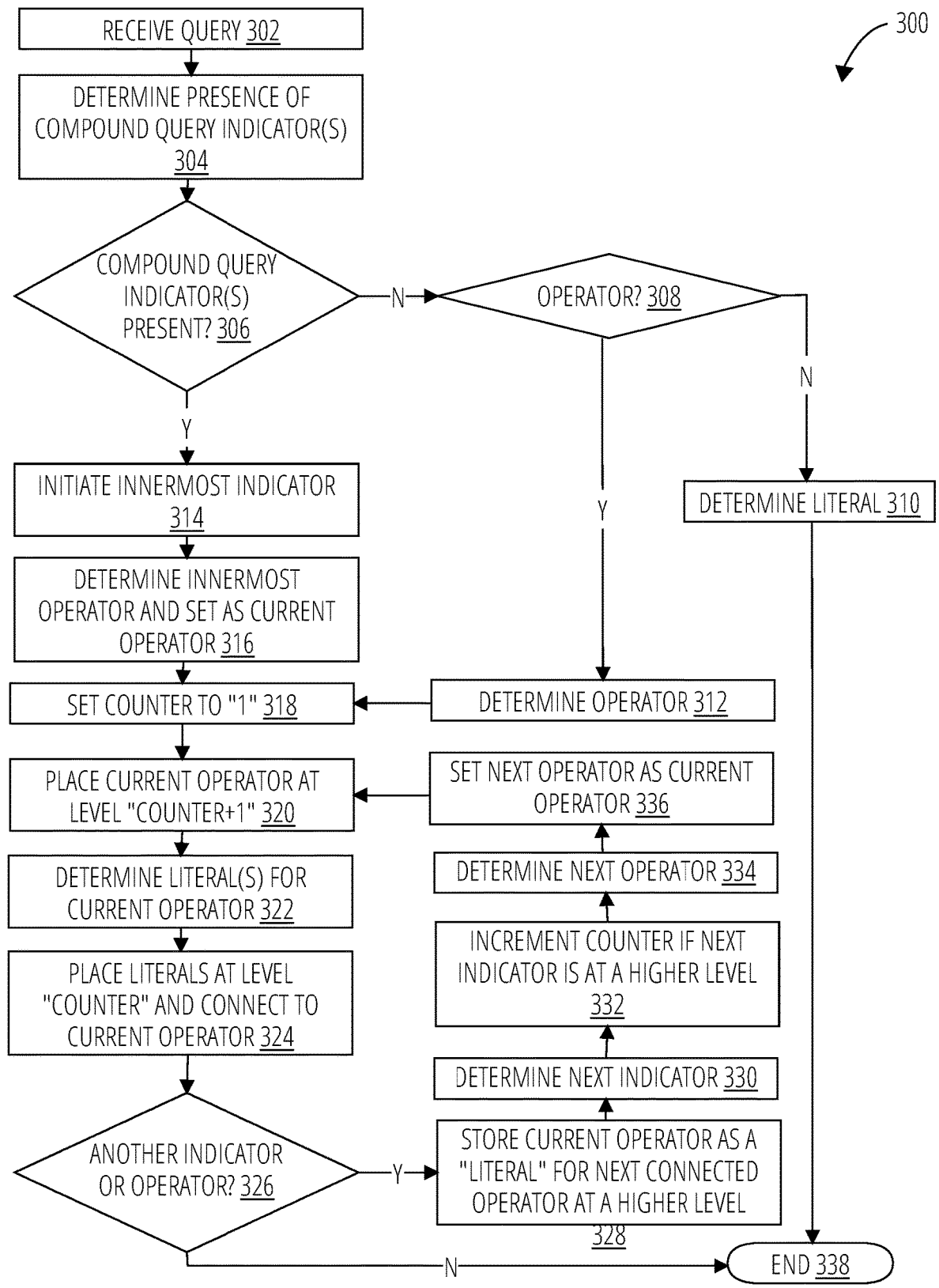
FIG. 3 illustrates an embodiment of a tree of operations generation method 300.

Referring to FIG. 3, a tree of operations generation method 300 receives a query (block 302). The presence of compound query indicator(s) is determined (block 304). If the tree of operations generation method 300 determines (decision block 306) that an indicator is not present, the tree of operations generation method 300 determine whether an operator is present (decision block 308). If not, the literal is determined (block 310). Any modifiers to the literal, such as the softness are also determined. If an operator is determined to be present that operator is determine (block 312). The operator is then sent to block 318.

If a compound query indicator is determined to be present, the innermost indicator is initialized (block 314). The indicator may be a set of parentheses. Mathematical operations may be utilized to determine which indicator is the innermost. If two indicators may both be considered innermost, one is selected. One such scheme is to select the indicator that is first from left to right. The innermost operator is then determined and set as the current operator (block 316). A counter is set to "1" (block 318). The counter may generally be initialized to any number or other value in other embodiments. The current operator is placed at level "counter+1" (block 320). The literal(s) are determined for the current operator (block 322). Those literals are placed at level "counter" and connected to current operator (block 324). The tree of operations generation method 300 then determines whether there is another indicator or operator (decision block 326). If so, the current operator is stored as a "literal" for the next connected operator at a higher level (block 328). The next indicator is determined (block 330). In cases where another operated is detected but no indicator is determined, the tree of operations generation method 300 may treat that operator as being in an indicator. The counter is incremented if the next indicator is at a higher level (block 332). The next operator is determined (block 334). The next operator is set as the current operator (block 336). The tree of operations generation method 300 then begins from block 320. Once only a literal is determined or there are no additional operators or indicators, the tree of operations generation method 300 ends (done block 338).

Figure 4:
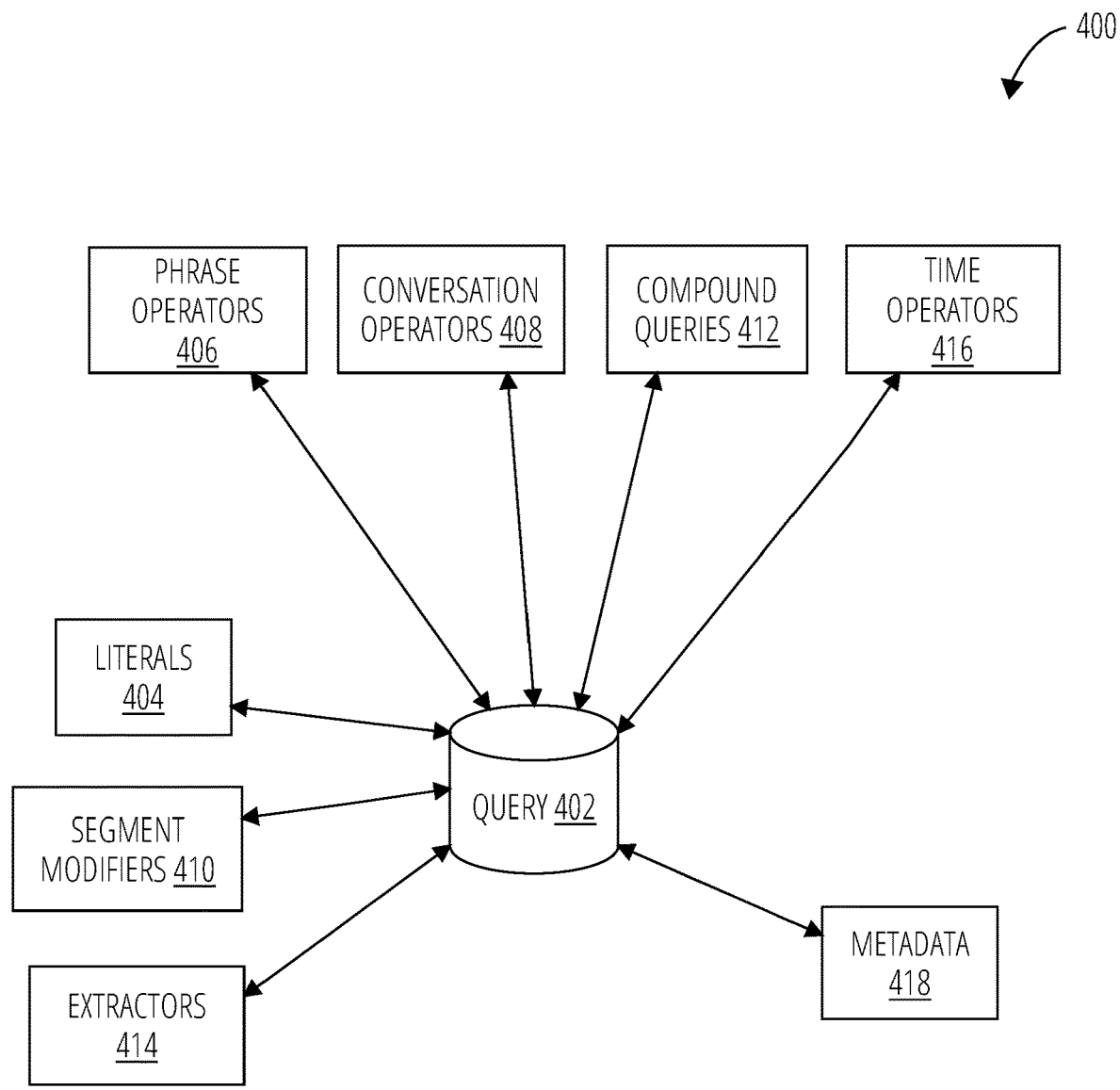
FIG. 4 illustrates an embodiment of a query types 400.

Referring to FIG. 4, query types 400 that may be stored in a query control memory structure 402 are depicted. The query types 400 may comprise literals 404, phrase operators 406, conversation operators 408, segment modifiers 410, compound queries 412, extractors 414, time operators 416, and metadata 418. The above does not constitute an exhaustive list of the query types 400.

The literals 404 are extracted from a query and compared to the transcript. The literals 404 may be indicated by quotations around a word or phrase. For example, the literals 404 may be "crash", "lost credit card", etc. Single quotes may be utilized as well in some embodiments, such as 'crash'. In other embodiments, other indicators for the literals 404 may be utilized. The indicators are utilized to determine which text is to be compared to the transcript. The literals 404 have an associated softness. The literals 404 may have a default softness of 0. However, this softness may be increased by a softness indicator, such as one to more tildes (~) added before the quoted word or phrase to "loosen up" similar matches (semantically, meaning similar in meaning not sound). In one embodiment, one tilde matches similar forms like plurals or conjugates. For example, ~"crash" matches "crashes" or "crashing". Two tildes match synonymous words. For example, ~~"crash" matches "accident" or "collision". Three tildes match related phrasings. For example, ~~~"have a nice day" matches "i hope your day is great". The softness associated with the literals 404 may be utilized to determine a threshold value for potential matches and incorporated into a softness map.

The phrase operators 406 are utilized to search within a speech segment for two things (e.g., the literals 404). Exemplary phrase operators 406 include "near", "or", or "then". For example, a query for ~~"crash" near "honda", looks for both ~~"crash" and "honda". The query ~~"crash" or "ticket" looks for either ~~"crash" or "ticket" or both. The query ~~"crash" then "police report" looks for both ~~"crash" and "police report" in order. That is, a transcript, "I had an accident and then they wrote a police report", would match; however, the transcript, "I found the police report after the crash", would not. The phrase operators 406 are placed within a tree of operations and utilized to combine the matches of the literals 404, if any.

The conversation operators 408 are utilized to search across an entire conversation for two things. Exemplary conversation operators 408 include "and", "or", and "later". The "and" operator looks for a conversation that contains both literals. They query ~~"lost card" and "two weeks" may match a conversation that looks like this:

Hello thanks for calling.
. . .
I want to report a missing card.
. . .
The new card should arrive in one to two weeks.
. . . .

However, by contrast the "near" operator may not match, because they span different speech segments. The "or" operator looks for a conversation that contains either literals or both. Its use is determined by context relative to the phrase scanner. The query caller ~~"lost card" or caller "two weeks" may match the following conversation:

Hello thanks for calling.
. . .
I want to report a missing card.
. . .
The new card should arrive in five days.
. . . .

The "later" operator looks for a conversation that contains both literals in order. For example, the query ~~~"reset my password" later ~"thanks" may match the following conversation:

Hello thanks for calling.
. . .
I need my password reset.
. . .
Thank you!
. . . .

However, if the final "thank you" was omitted, the conversation would not match, even though "thanks" was said earlier in the conversation.

The segment modifiers 410 are additional modifiers that may be placed to the left of a segment to restrict it to a certain property or modify it in some other way. Exemplary segment modifiers 410 include "agent", "caller", and "not". The "agent" segment modifier applies if an agent says the following phrase. An example query is agent ~~"great to hear". The "caller" segment modifier applies if a caller says the following phrase. An example query is caller ~~"very helpful". The "not" segment modifier applies if the following phrase does not occur. An exemplary query is not ~~"claim". Additionally, the segment modifiers 410 may be stacked (although order can affect meaning), such as not agent ~~"sorry" matches a conversation in which an agent does not apologize.

The compound queries 412 are utilized to build more complex queries. The compound queries 412 may be indicated by the utilization of parentheses in one embodiment. Other embodiments may utilize symbols to indicate the compound queries 412. Inner scanners are evaluated and then combined with outer scanners. An example is (~~"crash" near ~~"police report") or ~~~"file a claim". This phrase matches if a crash and police report are both mentioned or if a claim is filed (or both). However, "police report" alone would not match. The compound queries 412 may be done multiple times, such as ((((~~"crash" near ~~"police report") or ~~~"file a claim") later agent ~~"sorry") and caller not ~~"thank you") or "thank you for your help with the claim".

The extractors 414 are special phrases that may be indicated by curly braces "{ }" that represent a concept. In some embodiments, the extractors 414 are treated as if they have two tildes and thus can be omitted. The query ~~"hello my name is {name}" may match "hi my name is George". Further examples with likely matches include {firstName}—Anthony, Steve; {surname}—Richardson, Hernandez; {fullName}—Anthony Richardson, Steve Hernandez; {date}—March Fifth, Christmas; {time}—Five thirty a.m., Noon; {greeting}—Hi there, good morning; {polite}—Thanks, please; {positive}—Great, wonderful, amazing; {negative}-Terrible, awful, sad; {company}—Microsoft®, {zipCode}—Nine oh two one oh; {title}-Mister, Miss, Doctor; and {phoneNumber}—Eight six seven five three oh nine.

The time operators 416 place time constraints on scanners. A maximum duration, or less than an amount of time has passed, may be specified by utilizing an indicator, such as square brackets as well as the less than operator, a number, and units, such as [<30 s] is less than 30 seconds, [<5 s] is less than five seconds, and [<5 m] is less than five minutes. The query "interest rate" [<30 s] "a. p. r." looks for the phrase "a. p. r." less than thirty seconds after "interest rate". A minimum duration is similar to the maximum duration but requires that there be more than the specified amount of time between phrases. Examples include [>20 s] is more than 20 seconds, [>100 s] is more than one hundred seconds, and [>15 m] is more than fifteen minutes. Start and end tokens are time operators 416 that may be utilized to specify the start and end of the call. For example, {start} [<30 s] "thanks for calling" looks for "thanks for calling" being said in the first thirty seconds. Similarly, {end} can indicate the end of the call. The query "anything else today" [>1 m] {end} may enforce that "anything else today" was said greater than a minute before the end of the call.

The metadata 418 may be utilized to place constraints on call metadata, such as the date, start time, duration, or user-provided metadata. The metadata queries may be performed first, and then scanner is performed on the resulting subset.

Figure 5:
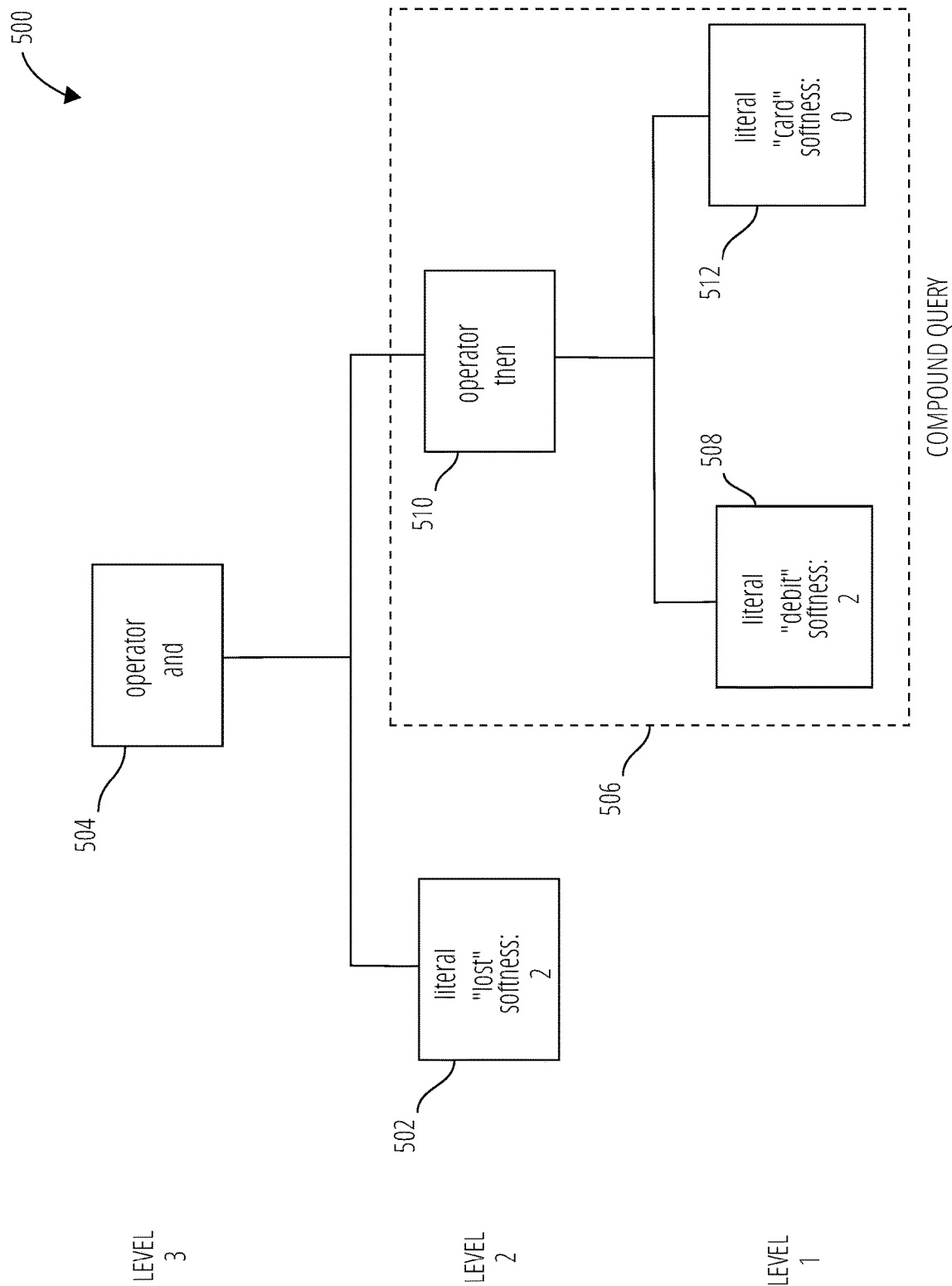
FIG. 5 illustrates an embodiment of a query tree 500.

Referring to FIG. 5, a query tree 500 comprises a first literal 502, a first operator 504, a compound query 506, a second literal 508, a second operator 510, and a third literal 512. The query tree 500 is generated from the query: ~~"lost" and (~~"debit" then "card"). The query is then compared to the transcript: "i think i have misplaced my credit card".

As the query has compound query indicators, here parentheses, that portion of the query is operated on first. The second operator 510 is determined to be the operator within the compound query 506 and is placed within the second level of the query tree 500. The literals for the second operator 510, the second literal 508 and the third literal 512, are determined and place in the first level of the query tree 500, connected to the second operator 510. The word or phrase of the literal and the associated softness is determined, which will then be utilized to compare to the transcript. The next operator, the first operator 504, is then determined and placed in the third level of the query tree 500. The connectors are then determined for the first operator 504, which are the first literal 502 and the second operator 510. The first literal 502 also has its word or phrase and associated softness determined to be utilized to compare to the transcript.

Figure 6:
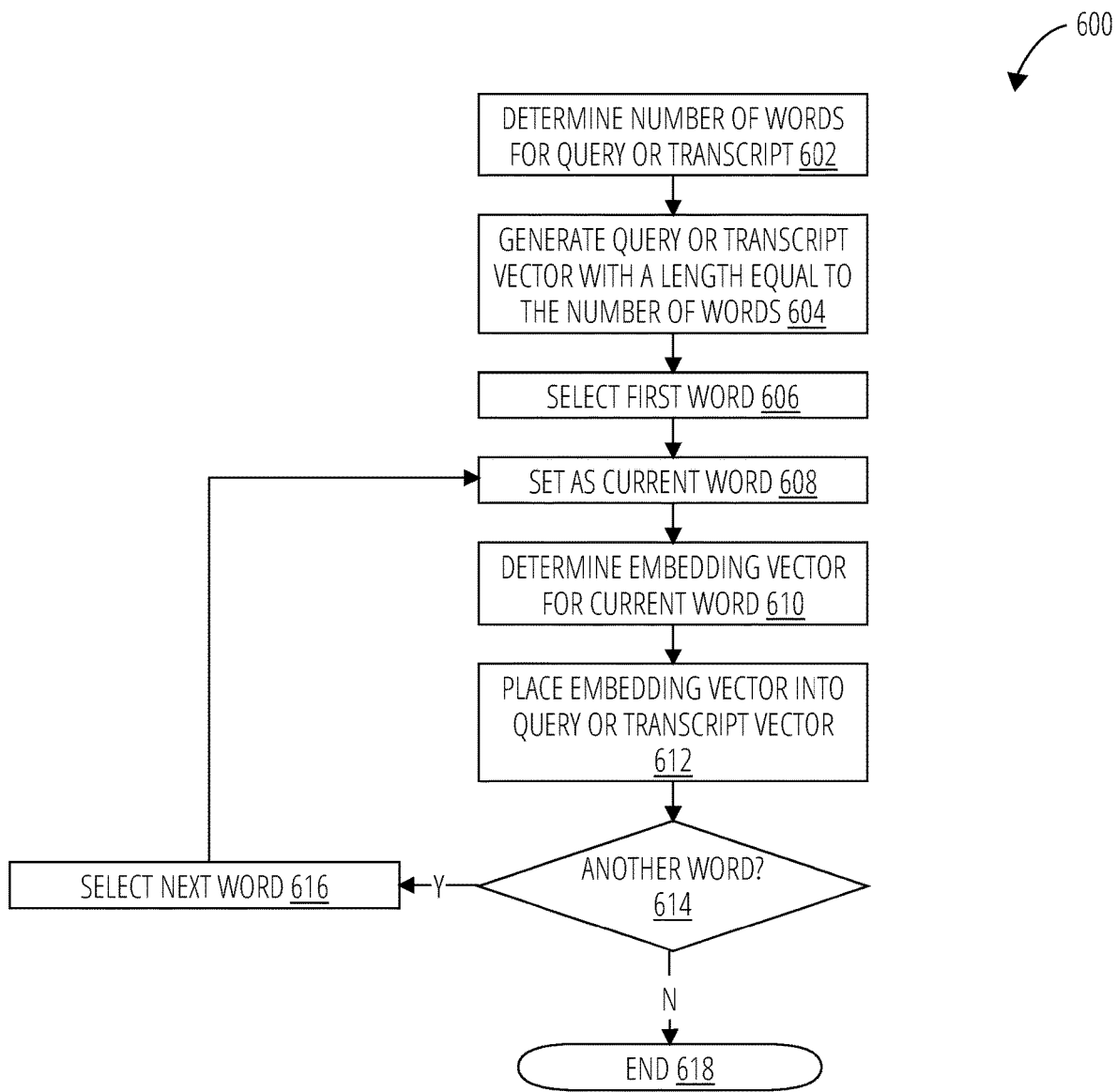
FIG. 6 illustrates an embodiment of a word embedding method 600.

Referring to FIG. 6, a word embedding method 600 determines a number of words for the query or transcript (block 602). The word embedding method 600 may be performed on both the query and the transcript. The query or transcript vector is generated with a length equal to the number of words (block 604). The first word is selected (block 606) and set as the current word (block 608). The embedding vector for current word is then determined (block 610). The embedding vector may be pre-determined and stored to be retrieved. The embedding vector may be between 50 and 1000 dimensions in some embodiments. The embedding vector is placed into query or transcript vector (block 612). The embedding vector replaces the word in the query or transcript vector. The word embedding method 600 then determines whether there is another word (decision block 614). If so, the next word is selected (block 616) and the word embedding method 600 is performed from block 608. Once the words are replaced by their word embeddings, the word embedding method 600 ends.

Referring to FIG. 7, a fast Fourier transformation system 700 comprises a query word embedding matrix 702, a transcript word embedding matrix 704, a Fourier fast transformer 706, a cross-correlator 708, and an inverse Fourier fast transformer 710.

The query word embedding matrix 702 and the transcript word embedding matrix 704 may be received from a matrix generator. The Fourier fast transformer 706 performs a Fourier transformation on the query word embedding matrix 702 and transcript word embedding matrix 704 to accelerate the performance of the cross-correlator 708 when generating the dot products for comparison. The cross-correlator 708 may perform point-wise multiplication and send the results to the inverse Fourier fast transformer 710. The output of the cross-correlator 708 may then be reverse transformed by the inverse Fourier fast transformer 710 using an inverse Fourier transform. The fast Fourier transformation system 700 may be operated in accordance with the process depicted in FIG. 8.

The fast Fourier transformation system 700 may be the default or an alternate system to perform the cross-correlation. A threshold may be utilized, based on factors, such as matrix size, to determine whether to utilize the fast Fourier transformation system 700.

Referring to FIG. 8, a fast Fourier transformation method 800 receives transcript and query matrices (block 802). A Fourier transform is applied on the transcript matrix and the query matrix (block 804). A point-wise multiplication is applied between the matrices (block 806). An inverse Fourier transform is applied to the point-wise product of the matrices (block 808). The resulting "dot products" are then sent to a comparator to determine any matches.

Figure 9:
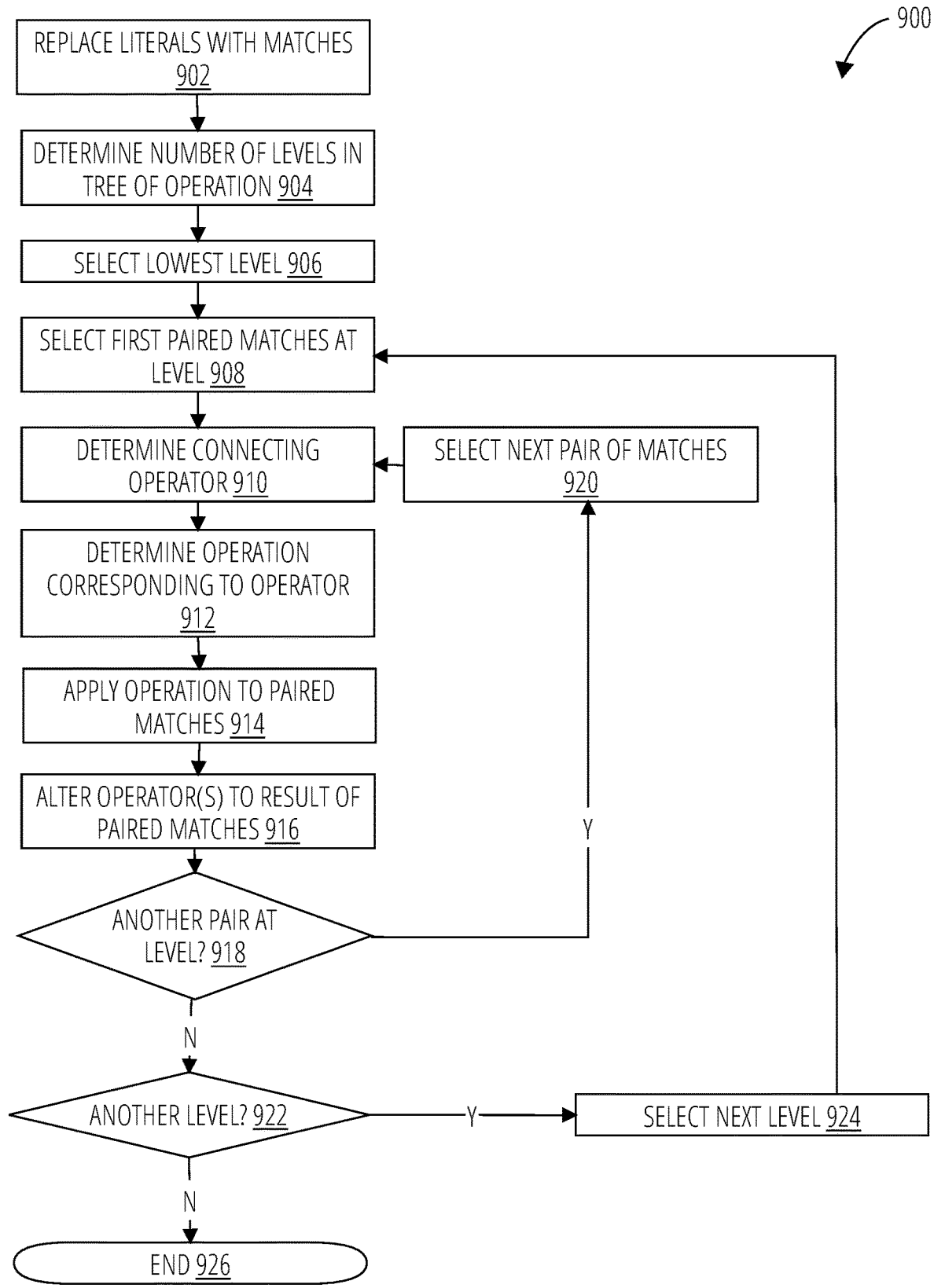
FIG. 9 illustrates an embodiment of a match combination method 900.

Referring to FIG. 9, a match combination method 900 replaces literals with matches (block 902). The literals may be received as part of a tree of operation. The matches may be received from a comparator. The number of levels in tree of operation is determined (block 904). The lowest level is selected (block 906). A first pair of matches at the level is selected (block 908). If multiple pairs are at the same level, one may be selected randomly, or by position (e.g., leftmost) to be performed first if performed in series. The pairs may be evaluated in parallel. In cases of a unary operator, the literal for that operator is selected. In some scenarios, the "literal" to be operated on is the result of an operator acting on a literal(s), such as for a compound query. The connecting operator is determined (block 910). The operation corresponding to the operator is determined (block 912). The operation may be stored along with the operator and retrieved to be performed on the literal(s). Exemplary operations include the "and" operator requiring a match in both literals. The new start is the minimum of the two original literal starts. The new end is the maximum of the two ends. The new match is the original two match strings concatenated with and (i.e., "credit" and "card"). The new query is combined in a similar way. The weight is the product of the input weights. In this way, "and" behaves like the match on the product of two cross-correlations. The "or" operator behaves similarly to "and", except it produces a sum rather than a product of the weights. The "then" operator behaves like "and" but requires time ordering be enforced. The "not" operator (which is a unary operator) inverts the input signal and adds small match regions at the ends so that it works with the "then" operator. The operation is applied to the literal, paired or otherwise (block 914). The operator(s) is altered to the result of paired matches (block 916). The tree of operations is reduced, and the position of the operator may now include the result of the operation performed on the literal(s) or previous replacement of an operator. In some embodiments, a threshold value is applied after the operation is performed to remove the match as a potential output. The match combination method 900 determines whether there is another pair at the level (decision block 918). If so, the next pair of matches is selected (block 920). As above one literal or reduced operator is selected for a unary operator. The match combination method 900 then is performed on the next pair from block 910.

Once a level has been reduced by operators, the match combination method 900 determines if there is another level (decision block 922). If so, the next level is selected (block 924), and the match combination method 900 is performed on the next level from block 908. Once all levels have been reduced, an output is generated. The output may include the start, end, weight, query, match, and extractions. Other information may be provided. The output may also be applied to the transcript to, for example, highlight the output. The match combination method 900 then ends (done block 926).

Figure 10:
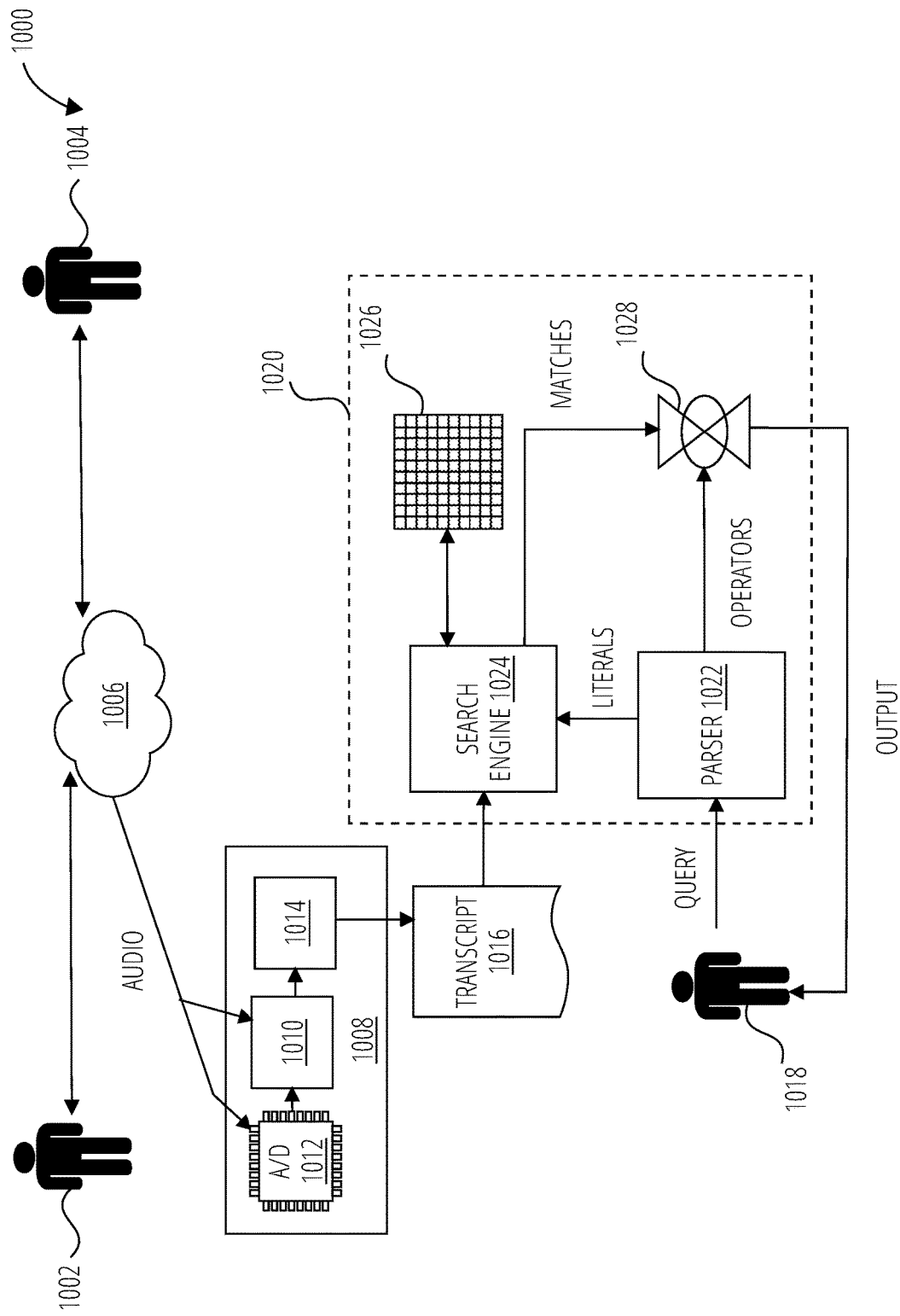
FIG. 10 illustrates an embodiment of a communication system 1000.

Referring to FIG. 10, a communication system 1000 comprises a first person 1002, a second person 1004, a network 1006, an audio transformation system 1008, a speech to text converter 1010, an analog to digital converter 1012, an enrichment logic 1014, a digital transcript 1016, a third person 1018, a query engine 1020, a query parser 1022, a search engine 1024, a quantitative thesaurus matrix 1026, and a combiner 1028.

The first person 1002 is in audio communication with a second person 1004 over a network 1006, for example an IP network, analog telephone network, or cellular network.

Audio from the communications may be recorded, or streamed live to an audio transformation system 1008, which converts the audio to metadata-enriched text. The audio transformation system 1008 may comprise a speech to text converter 1010 and enrichment logic 1014 to transform the audio into the enriched text. If the audio is in an analog format, the audio transformation system 1008 may utilize an analog to digital converter 1012 to convert to a digital format before providing the digital audio to the speech to text converter 1010.

The enriched text of the audio is output in the form of one or more digital files of a digital transcript 1016. A third person 1018 may search the digital transcript 1016 using queries. The queries, along with the digital transcript 1016, are operated on by a query engine 1020. The query engine 1020 may be operated according to the process depicted in FIG. 12.

The query engine 1020 inputs the query to a query parser 1022 to generate a tree of operations from words (literals) and operators of the query. The query parser 1022 may generate the tree of operation in accordance with the process depicted in FIG. 3. The query parser 1022 may further utilize the query types 400 to parse the query into the tree of operations. The literals and the digital transcript 1016 are input to a search engine 1024, which then retrieves the matches from the quantitative thesaurus matrix 1026. The quantitative thesaurus matrix 1026 may be generated based on the process depicted in FIG. 12. The matches are combined (combiner 1028) based on the operators extracted from the query by the query parser 1022. The combiner 1028 may be operated in accordance with the process depicted in FIG. 9.

Figure 11:
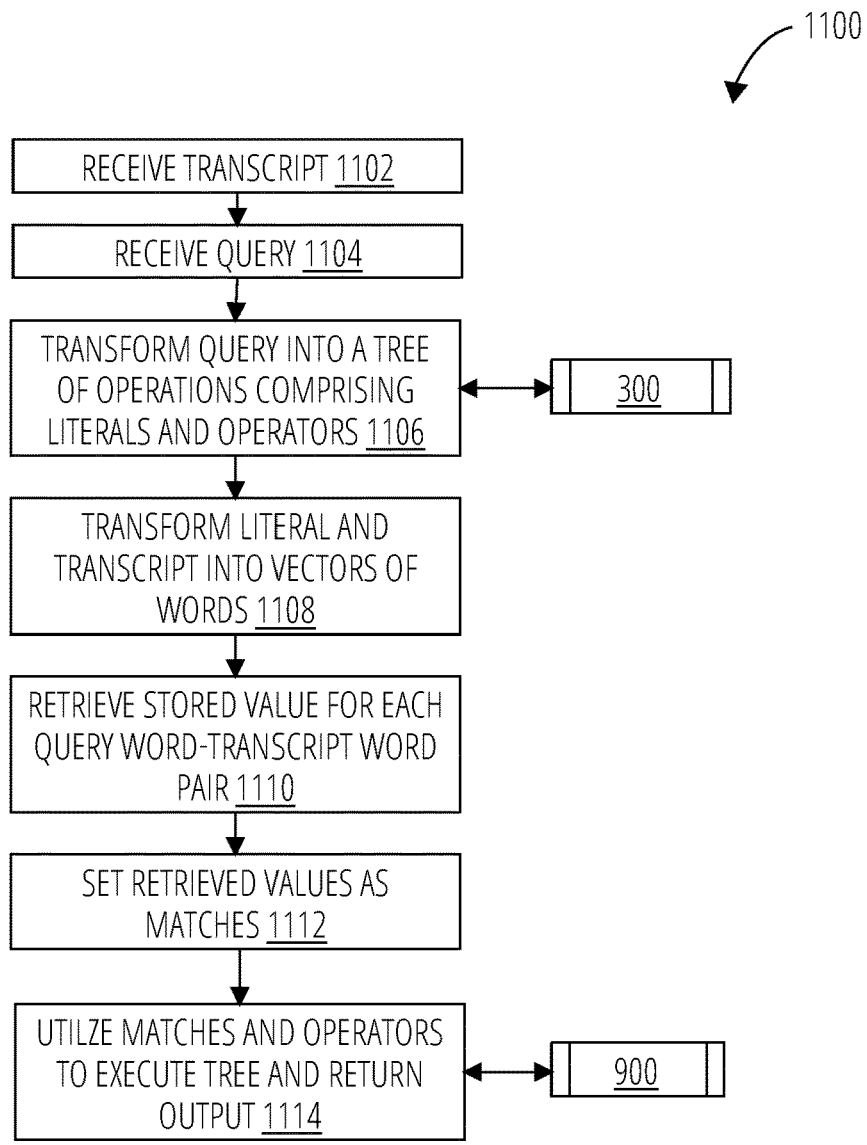
FIG. 11 illustrates an embodiment of a query method 1100.

Referring to FIG. 11, the transcript is received (block 1102). The query is also received (block 1104). The query is transformed into a tree of operations comprising literals and operators (block 1106). This step may be performed in accordance with the process depicted in FIG. 3. The literals and transcript are transformed into vectors of words (block 1108). The stored value for each query word-transcript word pair is retrieved (block 1110). The value may be stored in a sparse matrix. The sparse matrix may be generated in accordance with the process depicted in FIG. 12. Multiple thesauruses may be generated for each softness level. If a large document set is stored in a traditional search index (i.e., a hash-indexed table), the sparse matrix of word similarities may also be utilized to "explode" a query into the similar words. The exploded queries may also have similar composition rules for operators. This enables an approximate version of the scanner algorithm to be run as a pre-process against a traditional search index. For example, if the query is ~~"lost" it may be exploded to a hard query of "lost", "misplaced", "missing", etc. against a traditional search index. For single-word queries, this is exact. For phrase matches, this is approximate, but by setting the thresholds correctly, this may be a close approximation. The retrieved values are set as matches (block 1112). The matches and operators are utilized to execute the tree of operations and return output (block 1114). This may be performed in accordance with the process depicted in FIG. 9.

In another embodiment, the query method 1100 is utilized to pre-process a transcript comprising multiple documents. The search may be utilized to reduce the number of documents to perform the full scanner matrix operation to a small set of very relevant documents. That is, the transcript may initially include multiple documents. The query method 1100 is applied and those documents with the similar words are kept in the transcript to perform the full scanner operation, such as the process depicted in FIG. 2.

Figure 12:
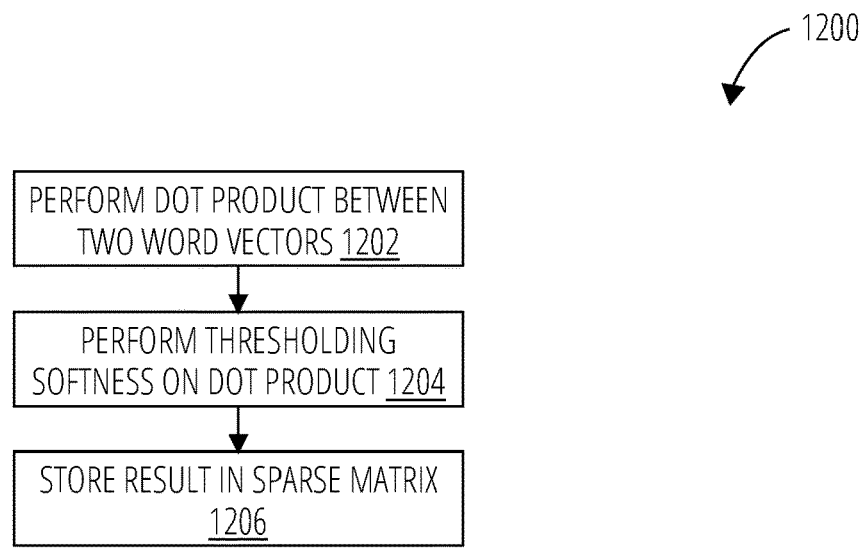
FIG. 12 illustrates in an embodiment of a sparse quantitative thesaurus matrix generation method 1200.

Referring to FIG. 12, a dot product is performed between two word vectors (block 1202). thresholding softness is performed on the dot product (block 1204). The result is stored in a sparse matrix (block 1206). An exemplary thesaurus is depicted in FIG. 13.

Figure 13:
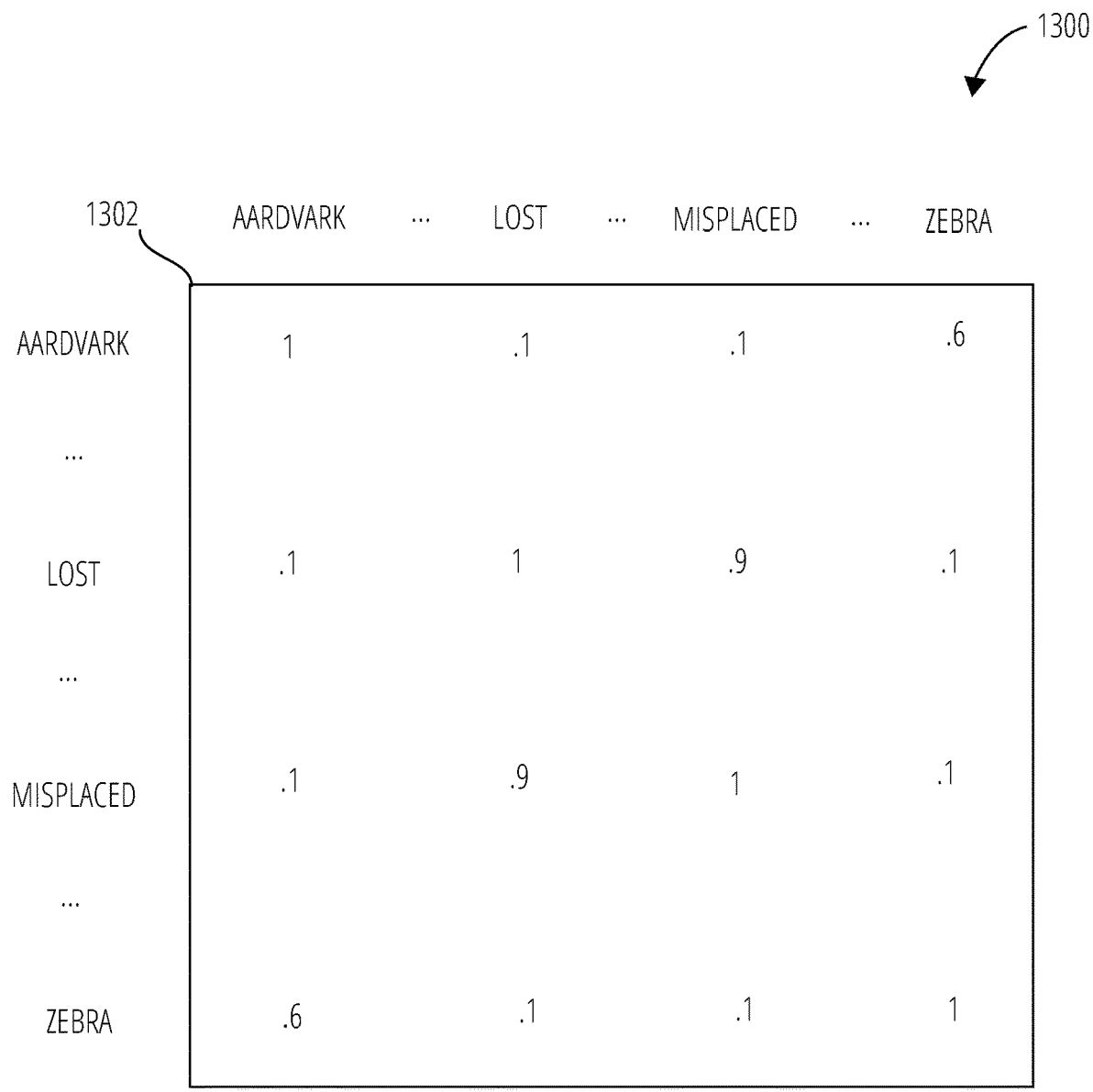
FIG. 13 illustrates a thesaurus 1300 in accordance with one embodiment.

Referring to FIG. 13, a thesaurus 1300 comprises similarity scores 1302 for the words aardvark, lost, misplaced, and zebra. The similarity scores 1302 may be determined by the process depicted in FIG. 12. When a query is received with one of the depicted words, the thesaurus 1300 may be searched. The similarity score may then be utilized along with the similar word(s) to construct another search(es). The similar word(s) may also be utilized to reduce a set of documents with those words. For example, if lost was the query word, misplaced may be selected as a similar word as the similarity score is 0.9. However, aardvark and zebra may not be selected as the similarity score is 0.1.

Figure 14:
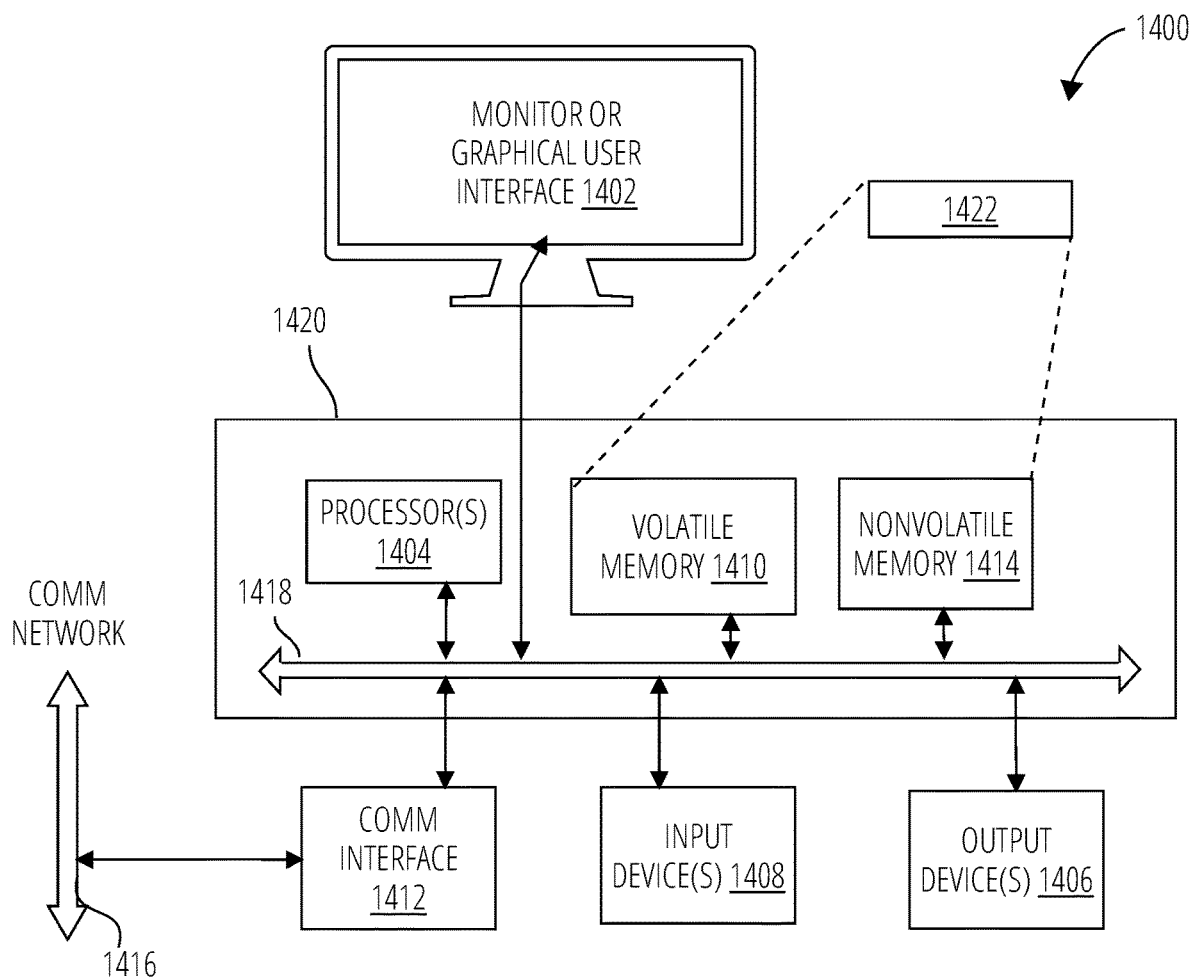
FIG. 14 is an example block diagram of a computing device 1400 that may incorporate embodiments of the present invention.

FIG. 14 is an example block diagram of a computing device 1400 (or computing apparatus) that may incorporate embodiments of the present invention. FIG. 14 is merely illustrative of a machine system to carry out aspects of the technical processes described herein, and does not limit the scope of the claims. One of ordinary skill in the art would recognize other variations, modifications, and alternatives. In one embodiment, the computing device 1400 typically includes a monitor or graphical user interface 1402, a data processing system 1420, a communication network interface 1412, input device(s) 1408, output device(s) 1406, and the like.

As depicted in FIG. 14, the data processing system 1420 may include one or more processor(s) 1404 that communicate with a number of peripheral devices via a bus subsystem 1418. These peripheral devices may include input device(s) 1408, output device(s) 1406, communication network interface 1412, and a storage subsystem, such as a volatile memory 1410 and a nonvolatile memory 1414.

The volatile memory 1410 and/or the nonvolatile memory 1414 may store computer-executable instructions and thus forming logic 1422 that when applied to and executed by the processor(s) 1404 implement embodiments of the processes disclosed herein.

The input device(s) 1408 include devices and mechanisms for inputting information to the data processing system 1420. These may include a keyboard, a keypad, a touch screen incorporated into the monitor or graphical user interface 1402, audio input devices such as voice recognition systems, microphones, and other types of input devices. In various embodiments, the input device(s) 1408 may be embodied as a computer mouse, a trackball, a track pad, a joystick, wireless remote, drawing tablet, voice command system, eye tracking system, and the like. The input device (s) 1408 typically allow a user to select objects, icons, control areas, text and the like that appear on the monitor or graphical user interface 1402 via a command such as a click of a button or the like.

The output device(s) 1406 include devices and mechanisms for outputting information from the data processing system 1420. These may include the monitor or graphical user interface 1402, speakers, printers, infrared LEDs, and so on as well understood in the art.

The communication network interface 1412 provides an interface to communication networks (e.g., communication network 1416) and devices external to the data processing system 1420. The communication network interface 1412 may serve as an interface for receiving data from and transmitting data to other systems. Embodiments of the communication network interface 1412 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 1412 may be coupled to the communication network 1416 via an antenna, a cable, or the like. In some embodiments, the communication network interface 1412 may be physically integrated on a circuit board of the data processing system 1420, or in some cases may be implemented in software or firmware, such as "soft modems", or the like.

The computing device 1400 may include logic that enables communications over a network using protocols such as HTTP, TCP/IP, RTP/RTSP, IPX, UDP and the like.

The volatile memory 1410 and the nonvolatile memory 1414 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1410 and the nonvolatile memory 1414 may be configured to store the basic programming and data constructs that provide the functionality of the disclosed processes and other embodiments thereof that fall within the scope of the present invention.

Logic 1422 that implements embodiments of the present invention may be stored in the volatile memory 1410 and/or the nonvolatile memory 1414. Said logic 1422 may be read from the volatile memory 1410 and/or nonvolatile memory 1414 and executed by the processor(s) 1404. The volatile memory 1410 and the nonvolatile memory 1414 may also provide a repository for storing data used by the logic 1422.

The volatile memory 1410 and the nonvolatile memory 1414 may include a number of memories including a main random access memory (RAM) for storage of instructions and data during program execution and a read only memory (ROM) in which read-only non-transitory instructions are stored. The volatile memory 1410 and the nonvolatile memory 1414 may include a file storage subsystem providing persistent (non-volatile) storage for program and data files. The volatile memory 1410 and the nonvolatile memory 1414 may include removable storage systems, such as removable flash memory.

The bus subsystem 1418 provides a mechanism for enabling the various components and subsystems of data processing system 1420 communicate with each other as intended. Although the communication network interface 1412 is depicted schematically as a single bus, some embodiments of the bus subsystem 1418 may utilize multiple distinct busses.

It will be readily apparent to one of ordinary skill in the art that the computing device 1400 may be a device such as a smartphone, a desktop computer, a laptop computer, a rack-mounted computer system, a computer server, or a tablet computer device. As commonly known in the art, the computing device 1400 may be implemented as a collection of multiple networked computing devices. Further, the computing device 1400 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

"quantitative thesaurus matrix" in this context refers to a matrix of similarity scores with indexes of query word-transcript word pairs.

"tree of operations" in this context refers to a structure depicting the order of operations of operators on the literals and the matches to the literals.

"transcript word embedding matrix" in this context refers to a transcript matrix that had each word transformed into a N-dimensional representation (word embedding). For N=300 and the transcript "Hi my name is Al", the transcript word embedding matrix is a 5×300 matrix.

"query word embedding matrix" in this context refers to a query matrix that had each word transformed into a N-dimensional representation (word embedding). For N=300 and the query "today is beautiful", the query word embedding matrix is a 3×300 matrix.

"query" in this context refers to a string of symbols that includes at least one literal and may include multiple literals and operators. E.g., "lost" then "card" includes two literals, lost and card, as well as the operator, then.

"literal" in this context refers to a word or phrase. E.g., "card".

"query word-transcript word pair" in this context refers to a pair of words determined by combining one word from the query matrix and one word from the transcript matrix. E.g., for the query "lost" and the transcript "I misplaced my card", there are four pairs, [lost, I], [lost, misplaced], [lost, my], and [lost, card].

"Word embedding" in this context refers to a learned representation for text where words that have the same meaning have a similar representation in a compact vector space. A benefit of the dense representations is generalization power: if certain features of how words are used in context provide clues, to their similar meaning, the word embedding representation may reflect these similarities. Word embeddings are a class of techniques where individual words are represented as real-valued vectors in a predefined vector space. Each word is mapped to one vector and the vector values can be learned, for example using a neural network. Each word is represented by a real-valued vector, often tens or hundreds of dimensions. This is contrasted to the thousands or millions of dimensions required for sparse word representations, such as a one-hot encoding. Each word in the vocabulary is represented by a feature vector that encodes different aspects of the word. Thus, each word is associated with a point in a vector space. The number of features (and hence the dimensionality of the vector) is much smaller than the size of the vocabulary. The distributed vector representation is learned based on the usage of words. This allows words that are used in similar ways to result in having similar vector representations, naturally capturing their meaning. This can be contrasted with the crisp but fragile representation in a bag of words model where, unless explicitly managed, different words have different representations, regardless of how they are used. The underlying linguistic theory is that words that have similar context will have similar meanings. "You shall know a word by the company it keeps."

"softness" in this context refers to a degree of relatedness between words. E.g., a softness of 2 may correspond to a synonym.

"query matrix" in this context refers to a vector with a length corresponding to the number of words in a literal and comprising the literal. The query matrix for the query "card" is a 1×1 matrix of [card]. The query matrix for the query "today is beautiful" is a 3×1 matrix: [today, is, beautiful].

"query flag" in this context refers to an indicator that a particular non-speech information is to be utilized for a word in a query. E.g., a "1" may indicate utilization and a "0" non-utilization.

"matches" in this context refers to a cross-correlation that exceeds a softness map.

"softness map" in this context refers to a threshold value corresponding to a given softness. E.g., a softness 1 may correspond to a softness map of 0.95.

"non-speech information" in this context refers to information regarding the meaning of a word, such as emotion, the speaker, etc. that is not the word itself.

"cross-correlation" in this context refers to a measure of similarity of two series as a function of the displacement of one relative to the other.

"transcript matrix" in this context refers to a vector with a length corresponding to the number of words in a transcript and comprising the words of the transcript. The transcript matrix for the transcript "Hi, my name is Al" is a 5×1 matrix of [Hi, my, name, is, Al].

"operator" in this context refers to a symbolic representation of an operation to be performed on one or two literals. E.g., and, then, or, etc.

"similarity score" in this context refers to a measure of the similarity between two word for a softness value. The similarity score for two words may be determined by the cross-correlation of the N-dimensional word vectors of the two words.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A method of reducing computational overhead of a search query, the method comprising:
    parsing the search engine query into literals and operators, wherein each of the literals comprises at least one word and wherein each of the operators is one of a binary operator and a unary operator, and the operators include at least one of phrase operators, conversation operators, and time operators;
    generating a query matrix from the literals;
    generating a transcript matrix from a document of a transcript data source, wherein the transcript data source comprises multiple documents storing metadata-enriched text generated from recorded or streamed audio communications,
    wherein the metadata-enriched text includes word embeddings and embedded non-speech data,
    wherein the word embeddings represent individual words using real-valued vectors in a predefined vector space and wherein words that have a same meaning have a similarity score indicating related vector reresentations in the predefined vector space, and wherein the similarity score is determined by the cross-correlation of the real-valued vectors representing the words in the predefined vector space, wherein the embedded non-speech data stores non-speech information detected in the recorded or streamed audio communications, and wherein the non-speech information includes at least one of: information regarding the meaning of words in the metadata-enriched text, a speaker role of a speaker in the recorded or streamed audio communications, and an emotion detected for the speaker from the recorded or streamed audio communication;

determining a cross-correlation of the query matrix and the metadata-enriched text in the transcript matrix;

applying a softness map to the cross-correlation to determine one or more matches for each of the literals, the softness map generated from a thresholding softness assigned to each of the literals as part of the search engine query, wherein the thresholding softness assigned to each of the literals determines how much semantic difference is permitted between the literal and the one or more matches for that literal, and wherein the one or more matches are identified from the cross-correlations that fall above the thresholding softness assigned to the literal;

building a tree of operations, the tree of operations comprising the literals and the operators of the search engine query;

combining the one or more matches utilizing the tree of operations and the operators to generate search result output, each of the operators corresponding to a combination operation for the matches, wherein the combination operation operators include at least one of:
"and" where a weight of the one or more matches is a product of input weights;
"or" where the weight of the one or more matches is a sum of input weights;
"then" where the weight of the one or more matches is the product of input weights, and time ordering is enforced;
"later" where the weight of the one or more matches is the product of input weights, and time ordering is enforced;
"near" where the weight of the one or more matches is the product of input weights when the one or more matches are found near each other
a less than time operator where the weight of the one or more matches is the product of input weights when a time less than that specified separates the two matches; and
a greater than time operator where the weight of the one or more matches is the product of input weights when a time more than that specified separates the two matches;

returning the search result output after performing each binary or unary operation on the one or more matches associated with the literals comprising the tree of operations; and reducing a number of documents in the transcript data source by applying the search result output of the previous steps, thereby reducing a memory and computational overhead of a subsequent query.

2. The method of claim 1, wherein determining the cross-correlation of the query matrix and the metadata-enriched text in the transcript matrix comprises:
transforming the query matrix and the transcript matrix into a query word embedding matrix and transcript word embedding matrix utilizing a multi-dimensional word embedding for each word in the query matrix and the transcript matrix, wherein the query word embedding matrix is created by replacing each word in the query matrix with the multi-dimensional word embedding for that word and the transcript word embedding matrix is created by replacing each word in the transcript matrix with the multi-dimensional word embedding for that word; and
determining a sum of dot products of the query word embedding matrix and the transcript word embedding matrix.

3. The method of claim 2, wherein query word-transcript word pairs from the query word embedding matrix and the transcript word embedding matrix and the sum of the dot products for each of the query word-transcript word pairs is stored in a quantitative thesaurus matrix.

4. The method of claim 1, wherein determining the cross-correlation of the query matrix and the metadata-enriched text in the transcript matrix comprises:
transforming the query matrix and the transcript matrix into a query word embedding matrix and a transcript word embedding matrix utilizing a multi-dimensional word embedding for each word in the query matrix and the transcript matrix, wherein the query word embedding matrix is created by replacing each word in the query matrix with the multi-dimensional word embedding for that word and the transcript word embedding matrix is created by replacing each word in the transcript matrix with the multi-dimensional word embedding for that word;
applying a fast Fourier transform to the transcript word embedding matrix and the query word embedding matrix to generate a transformed transcript word embedding matrix and a transformed query word embedding matrix;
determining a point-wise product of the transformed transcript word embedding matrix and the transformed query word embedding matrix; and
applying an inverse fast Fourier transform to the point-wise product to recover the cross-correlation of the transformed transcript word embedding matrix with the transformed query word embedding matrix.

5. The method of claim 1, further comprising:
transforming the query matrix and the transcript matrix into a query word embedding matrix and a transcript word embedding matrix utilizing a multi-dimensional word embedding for each word in the query matrix and the transcript matrix, wherein the query word embedding matrix is created by replacing each word in the query matrix with the multi-dimensional word embedding for that word and the transcript word embedding matrix is created by replacing each word in the transcript matrix with the multi-dimensional word embedding for that word;
determining when at least one of the literals comprises two or more words; and
on condition when at least one of the literals comprises the two or more words, applying a Gaussian kernel to the transcript word embedding matrix before determining the cross-correlation using a fast Fourier transformation system.

6. The method of claim 1, wherein determining the cross-correlation of the query matrix and the metadata-enriched text in the transcript matrix comprises:
determining query word-transcript word pairs, wherein sums of dot products for each of the query word-transcript word pairs are stored in a sparse matrix and are retrievable from the sparse matrix, wherein the sparse matrix is a quantitative thesaurus matrix;

sending a control to the quantitative thesaurus matrix to return the similarity score for each of the query word-transcript word pairs; and setting the cross-correlation equal to the similarity score.

7. The method of claim 1, further comprising:

determining query word-transcript word pairs, wherein the sum of dot products for each of the query word-transcript word pairs are stored in a sparse matrix and are retrievable from the sparse matrix, wherein the sparse matrix is a quantitative thesaurus matrix;

sending a control to the quantitative thesaurus matrix to return similar words, the similar words having a similarity score above the thresholding softness for each of the literals;

determining a set of remaining documents of the transcript data source having at least one of the similar words; and utilizing the set of remaining documents as the transcript data source.

8. The method of claim 1, wherein the search engine query further comprises non-speech information, further comprising adding a non-speech information dimension to the query matrix and the transcript matrix.

9. The method of claim 8, wherein the non-speech information is an emotion model:

the non-speech information dimension of the query matrix being a query flag; and the non-speech information dimension of the transcript matrix being an output of the emotion model.

10. The method of claim 8, wherein the non-speech information is speaker metadata:

the non-speech information dimension of the query matrix being a query flag; and the non-speech information dimension of the transcript matrix being an indication of a speaker.

11. A computing apparatus, the computing apparatus comprising:

a processor; and a memory storing instructions that, when executed by the processor, configure the apparatus to:

parse a search engine query into literals and operators, wherein each of the literals comprises at least one word and wherein each of the operators is one of a binary operator and a unary operator, and the operators include at least one of phrase operators, conversation operators, and time operators;

generate a query matrix from the literals;

generate a transcript matrix from a document of a transcript data source, wherein the transcript data source comprises multiple documents storing metadata-enriched text generated from recorded or streamed audio communications, wherein the metadata-enriched text includes word embeddings and embedded non-speech data, wherein the word embeddings represent individual words using real-valued vectors in a predefined vector space and wherein words that have a same meaning have a similarity score indicating related vector representations in the predefined vector space, and wherein the similarity score is determined by the cross-correlation of the real-valued vectors representing the words in the predefined vector space, wherein the embedded non-speech data stores non-speech information detected in the recorded or streamed audio communications, and wherein the non-speech information includes at least one of: information regarding the meaning of words in the metadata-enriched text, a speaker role of a speaker in the recorded or streamed audio communications, and an emotion detected for the speaker from the recorded or streamed audio communication;

determine a cross-correlation of the query matrix and the metadata-enriched text in the transcript matrix;

apply a softness map to the cross-correlation to determine one or more matches for each of the literals, the softness map generated from a thresholding softness assigned to each of the literals as part of the search engine query, wherein the thresholding softness assigned to each of the literals determines how much semantic difference is permitted between the literal and the one or more matches for that literal, and wherein the one or more matches are identified from the cross-correlations that fall within the thresholding softness assigned to the literal;

build a tree of operations, the tree of operations comprising the literals and the operators of the search engine query;

combine the one or more matches utilizing the tree of operations and the operators to generate search result output, each of the operators corresponding to a combination operation for the matches, wherein the combination operation operators include at least one of:

"and" where a weight of the one or more matches is a product of input weights;

"or" where the weight of the one or more matches is a sum of input weights;

"then" where the weight of the one or more matches is the product of input weights, and time ordering is enforced;

"later" where the wei ht of the one or more matches is the roduct of in ut weights, and time ordering is enforced;

"near" where the weight of the one or more matches is the product of in u weights when the one or more matches are found near each other, a less than time operator where the weight of the one or more matches is the product of input weights when a time less than that specified separates the two matches; and a reater than time o erator where the wei ht of the one or more matches is the product of input weights when a time more than that specified separates the two matches;

return the search result output after performing each binary or unary operation on the one or more matches associated with the literals comprising the tree of operations; and reduce a number of documents in the transcript data source by applying the search result output of the previous steps, thereby reducing a memory and computational overhead of a subsequent query.

12. The computing apparatus of claim 11, wherein determining the cross-correlation of the query matrix and the metadata-enriched text in the transcript matrix comprises:

transform the query matrix and the transcript matrix into a query word embedding matrix and a transcript word embedding matrix utilizing a multi-dimensional word embedding for each word in the query matrix and the transcript matrix, wherein the query word embedding matrix is created by replacing each word in the query matrix with the multi-dimensional word embedding for that word and the transcript word embedding matrix is created by replacing each word in the transcript matrix with the multi-dimensional word embedding for that word; and determine a sum of dot products of the query word embedding matrix and the transcript word embedding matrix.

13. The computing apparatus of claim 12, wherein query word-transcript word pairs from the query word embedding matrix and the transcript word embedding matrix and the sum of the dot products for each of the query word-transcript word pairs is stored in a quantitative thesaurus matrix.

14. The computing apparatus of claim 11, wherein determining the cross-correlation of the query matrix and the metadata-enriched text in the transcript matrix comprises:

transform the query matrix and the transcript matrix into a query word embedding matrix and a transcript word embedding matrix utilizing a multi-dimensional word embedding for each word in the query matrix and the transcript matrix, wherein the query word embedding matrix is created by replacing each word in the query matrix with the multi-dimensional word embedding for that word and the transcript word embedding matrix is created by replacing each word in the transcript matrix with the multi-dimensional word embedding for that word;

apply a fast Fourier transform to the transcript word embedding matrix and the query word embedding matrix to generate a transformed transcript word embedding matrix and a transformed query word embedding matrix;

determine a point-wise product of the transformed transcript word embedding matrix and the transformed query word embedding matrix; and apply an inverse fast Fourier transform to the point-wise product to recover the cross-correlation of the transformed transcript word embedding matrix with the transformed query word embedding matrix.

15. The computing apparatus of claim 11, wherein the instructions further configure the apparatus to:

transform the query matrix and the transcript matrix into a query word embedding matrix and a transcript word embedding matrix utilizing a multi-dimensional word embedding for each word in the query matrix and the transcript matrix, wherein the query word embedding matrix is created by replacing each word in the query matrix with the multi-dimensional word embedding for that word and the transcript word embedding matrix is created by replacing each word in the transcript matrix with the multi-dimensional word embedding for that word;

determine when at least one of the literals comprises two or more words; and on condition when at least one of the literals comprises the two or more words, apply a Gaussian kernel to the transcript word embedding matrix before determining the cross-correlation using a fast Fourier transformation system.

16. The computing apparatus of claim 11, wherein determining the cross-correlation of the query matrix and the metadata-enriched text in the transcript matrix comprises:

determine query word-transcript word pairs, wherein sums of dot products for each of the query word-transcript word pairs are stored in a sparse matrix and are retrievable from the sparse matrix, wherein the sparse matrix is a quantitative thesaurus matrix;

send a control to the quantitative thesaurus matrix to return the similarity score for each of the query word-transcript word pairs; and set the cross-correlation equal to the similarity score.

17. The computing apparatus of claim 11, wherein the instructions further configure the apparatus to:

determine query word-transcript word pairs, wherein the sum of dot products for each of the query word-transcript word pairs are stored in a sparse matrix and are retrievable from the sparse matrix, wherein the sparse matrix is a quantitative thesaurus matrix;

send a control to the quantitative thesaurus matrix to return similar words, the similar words having a similarity score above the thresholding softness for each of the literals;

determine a set of remaining documents of the transcript data source having at least one of the similar words; and utilize the set of remaining documents as the transcript data source.

18. The computing apparatus of claim 11, wherein the search engine query further comprises non-speech information, wherein the instructions further configure the apparatus to add a non-speech information dimension to the query matrix and the transcript matrix.

19. The computing apparatus of claim 18, wherein the non-speech information is an emotion model:

the non-speech information dimension of the query matrix being a query flag; and the non-speech information dimension of the transcript matrix being an output of the emotion model.

20. The computing apparatus of claim 18, wherein the non-speech information is speaker metadata:

the non-speech information dimension of the query matrix being a query flag; and the non-speech information dimension of the transcript matrix being an indication of a speaker.

* * * * *